(12) United States Patent
Muise et al.

(10) Patent No.: US 7,421,090 B2
(45) Date of Patent: Sep. 2, 2008

(54) TARGET DETECTION SYSTEM USING TRAINED AND UNTRAINED DETECTION AND METHODS THEREFOR

(75) Inventors: Robert Muise, Oviedo, FL (US); Abhijit Mahalanobis, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 929 days.

(21) Appl. No.: 10/465,723

(22) Filed: Jun. 20, 2003

(65) Prior Publication Data
US 2004/0047492 A1    Mar. 11, 2004

Related U.S. Application Data

(60) Provisional application No. 60/389,899, filed on Jun. 20, 2002.

(51) Int. Cl.
*G06K 9/00*  (2006.01)

(52) U.S. Cl. ............... 382/103; 382/156; 382/159; 382/209; 348/143; 348/152

(58) Field of Classification Search ............ 382/103, 382/260, 263, 282, 156, 157, 159, 190, 209, 382/219; 358/537, 538, 452, 453; 348/143, 348/152, 207.1, 208.14
See application file for complete search history.

(56) References Cited

U.S. PATENT DOCUMENTS

| | | | | |
|---|---|---|---|---|
| 5,323,470 | A * | 6/1994 | Kara et al. | 382/103 |
| 5,546,195 | A * | 8/1996 | Arai | 358/518 |
| 5,583,966 | A * | 12/1996 | Nakajima | 706/52 |
| 5,584,050 | A * | 12/1996 | Lyons | 455/2.01 |
| 5,586,317 | A * | 12/1996 | Smith | 719/320 |
| 5,771,311 | A * | 6/1998 | Arai | 382/162 |
| 6,421,463 | B1 * | 7/2002 | Poggio et al. | 382/224 |
| 6,597,800 | B1 * | 7/2003 | Murray et al. | 382/103 |
| 6,775,411 | B2 * | 8/2004 | Sloan et al. | 382/224 |
| 7,139,411 | B2 * | 11/2006 | Fujimura et al. | 382/103 |

* cited by examiner

*Primary Examiner*—Yosef Kassa
(74) *Attorney, Agent, or Firm*—Birch, Stewart, Kolasch & Birch, LLP (57) ABSTRACT

A target detection system and method is disclosed that uses a trained detection component and an untrained detection component that enhances image data for candidate target detection. The trained detection component separates candidate targets from clutter within the image data using correlation filters trained from an image library. The image library includes target and clutter images that are used to tune the correlation filters. The untrained detection component separates the candidate targets from the clutter by suppressing clutter using a Fourier frequency transform of the image data. Anomalies are detected in the frequency domain, and retained to highlight candidate targets.

25 Claims, 6 Drawing Sheets

TARGET DETECTION SYSTEM USING TRAINED AND UNTRAINED DETECTION AND METHODS THEREFOR

CROSS REFERENCE TO RELATED APPLICATIONS

This application claims benefit of U.S. Provisional Patent Application No. 60/389,899 entitled "A Method and System For Detecting and Enhancing Target Imagery," filed Jun. 20, 2002, which is hereby incorporated by reference.

FIELD OF INVENTION

The present invention relates to target detection algorithms for processing acquired imagery data, and, more particularly, to a system and method for enhancing target imagery for trained and untrained detector components in detection systems.

BACKGROUND OF THE INVENTION

Recognizing targets in images is a challenge to existing detection systems. One of the primary functions of automatic target recognition is to find candidate targets and separate them from clutter. This process can be defined as target detection. Using image data for automatic target detection, a sample of target pixels can be statistically different from a sample of background pixels in the immediate neighborhood of the candidate target. Algorithms then can be devised to recognize groups or individual outlying pixels as indicating a possible target to be further processed by an automatic target recognition algorithm. Conventional detection systems can analyze images for pixel distortion to indicate a difference from the background or clutter, this difference being a candidate target.

Received images can be filtered and processed using conventional methods to detect peaks of energy that identify candidate targets. Problems, however, occur when the peaks of energy are not so readily identifiable compared with the background, or clutter. Further, false alarms occur when clutter or other non-target image data is tagged as a candidate target. Processing detection resources are wasted in these efforts. Thus, in conventional systems, potential candidate targets cannot be readily identified, or resources are used inefficiently.

SUMMARY OF THE INVENTION

Accordingly, the disclosed embodiments are directed to a target detection system and methods using trained and untrained detection for target detection applications. The disclosed embodiments enhance the identification of candidate targets while simultaneously suppressing clutter, or false targets detection.

According to the disclosed embodiments, a target detection system receives image data includes a trained detection component that separates candidate target regions from clutter within the image data using a bank of correlation filters trained from an image library. The system also includes an untrained detection component that separates the candidate target regions from the clutter by enhancing the image data using a frequency transform. The system also includes an output highlighting the candidate target regions.

Further according to the disclosed embodiments, a method for enhancing imagery for target detection includes receiving image data. The method also includes determining candidate target regions from clutter within the image data using a set of linear correlation filters. The linear correlation filters are trained using an image library. The method also includes determining the candidate target regions from the clutter by suppressing the clutter in a frequency domain transform of the image data. The method also includes identifying peak detections from an output generated by the determining steps. The peak detections correspond to candidate targets.

Additional features or advantages of the disclosed embodiments are set forth in the description that follows, and in part will be implied from the description, or can be learned by practice of the invention. The objectives and other advantages of the invention can be realized and attained by the structure and methods particularly pointed out in the written description and the claims as well as the appended drawings.

BRIEF DESCRIPTION OF THE DRAWINGS

The accompanying drawings, that are included to provide further understanding of the disclosed embodiments, illustrate embodiments of the invention, and together with the description serve to explain the principles of the invention. In the drawings.

DETAILED DESCRIPTION OF THE PREFERRED EMBODIMENTS

Aspects of the invention are disclosed in the accompanying description. Alternate embodiments of the present invention can be devised without parting from the spirit or scope of the present invention. It should be noted that like elements in the figures are indicated by like reference numbers.

Figure 1:
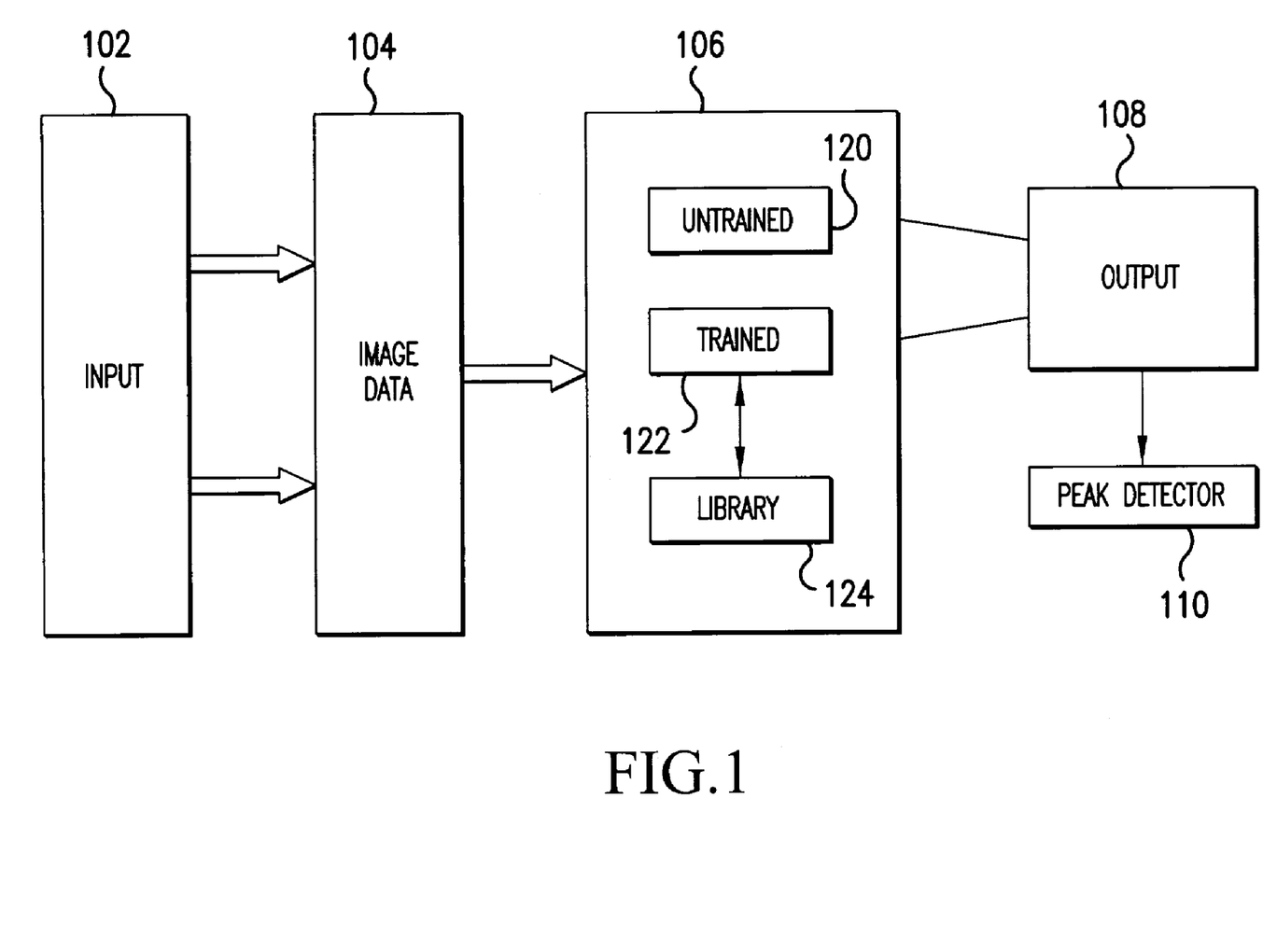
FIG. 1 illustrates a detection system according to the disclosed embodiments.

FIG. 1 depicts a detection system 100 according to the disclosed embodiments. Detection system 100 includes input device 102 that receives or captures image data 104. Input device 102 can be a plurality of sensors, a scanner, a camera or cameras, a processor, a disk drive, or any device capable of retrieving data from a storage, and the like. Input device 102 can refine, or perform processing operations on, image data 104. Image data 104 preferably is an image containing potential candidate targets and other information. Preferably, image data 104 is comprised of pixels. Each pixel can have different characteristics, such as brightness, color, contrast, and the like. More preferably, image data 104 can be an infrared image captured by infrared sensors coupled to input device 102.

Image enhancement and detection device 106 receives image data 104. Enhancement and detection device 106 includes untrained detection component 120 and trained detection component 122. Trained detection component 122 is coupled to an image library 124 that stores images of targets and clutter. Enhancement and detection device 106 can be any device that executes a process or an application. For example, enhancement and detection device 106 can be a computer, a processor, a software program, and the like. Enhancement and detection device 106 processes image data 104 to maximize and enhance candidate target detection. Enhancement and detection device 106 also includes memory or other means of data storage. Image library 124 can reside in this memory. Preferably, enhancement and detection device 106 is coupled to additional components within detection system 100. Enhancement and detection device 106 also can be connected to a local or remote network of other enhancement and detection devices.

Enhancement and detection device 106 executes algorithms devised to recognize group or individual pixels in the possible target. Preferably, image data 104 is enhanced to raise the intensity of outlying pixels while suppressing background pixels. Preferably, outlying pixels are those pixels that are not readily identifiable as target pixels, and lie a distance apart from the identifiable target pixels. The pixels of image data 104 are thresholded to produce an enhanced output 108. Enhancement and detection device 106 controls and operates untrained detection component 120 and trained detection component 122 for enhancing image data 104 to detect candidate targets.

In some applications, the library of targets desired to be detected are known in advance. Algorithms that utilize this apriori knowledge of target image library 124 are referred to as "trained" detector algorithms. Algorithms that do not use apriori knowledge are referred to as "untrained" detector algorithms. An untrained detection algorithm relies on statistics of the local image intensity in order to highlight regions that are statistically different from the region's immediate surroundings. Untrained detector algorithms are desirable in certain circumstances. For example, untrained detection algorithms are used when insufficient image data exists in image library 124 for the candidate targets. Further, untrained detection algorithms are used to highlight candidate targets by analyzing and retaining areas of intensity in the image data that is then used by trained detection algorithms to identify targets. Untrained detection algorithms do not require apriori knowledge and, thus, can be used on image data 104 when image library 124 is not applicable or available.

Preferably, enhancement and detection device 106 executes untrained detection component 120 and trained detection component 122 in parallel on image data 104. Both components 120 and 122 produce processed data that is then combined to generate output 108. Output 108 is an enhanced data set of the image data 104. Output 108 also can be known as an output map that includes peak detections. Alternatively, enhancement and detection device 106 executes untrained detection component 120 and, subsequently, trained detection component 122 in a sequential manner to generate output 108. Untrained detection component 120 is used to enhance image data 104 to detect candidate targets after trained detection component 122 uses a library of targeted and clutter images.

Peak detection component 110 analyzes output 108 for positive peak detections that indicate candidate targets and negative peak detections that indicate possible clutter, or background. Preferably, peak detection component 110 is separable from enhancement and detection device 106. Alternatively, peak detection component 110 is included in enhancement and detection device 106. Peak detection component 110 facilitates the detection of target pixels that are resident in image data 104. Thus, image data 104 can be received by detection system 100 and enhanced to detect targets.

Figure 2:
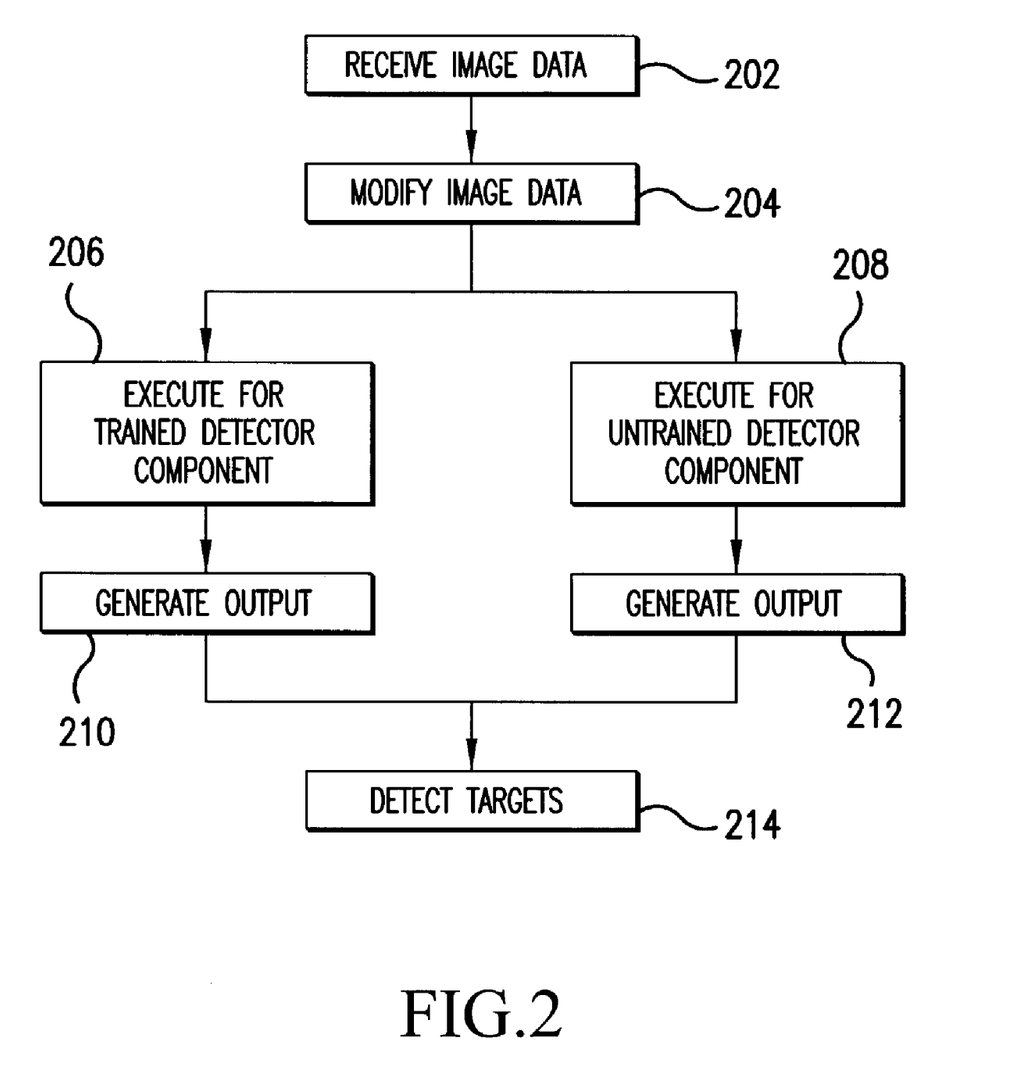
FIG. 2 illustrates a flowchart for enhancing imagery for target detection according to the disclosed embodiments.

FIG. 2 depicts a flowchart for enhancing imagery for target detection according to the disclosed embodiments. Preferably, the flowchart of FIG. 2 is implemented by the hardware configuration disclosed by FIG. 1. Step 202 executes by receiving image data. Referring back to FIG. 1, image data 104 is received. Preferably, the image data is an infrared image taken of potential candidate targets. Step 204 executes by modifying the image data. The received image data can be modified to fit parameters specified by the detection processing and components. For example, referring back to FIG. 1, enhancement and detection device 106 desires image data 104 to have a size m×n. Preferably, a smaller image should not work, but a larger image yields valid output. Any conventional process for manipulating images modifies the image data.

Step 206 executes by executing detection and enhancement operations for trained detector components. Preferably, step 206 is executed using trained detection component 122 of FIG. 1. Step 206 executes by applying correlation filters to the image data. The correlation filters are created, or "trained," using images from the image library, such as image library 124 of FIG. 1. A clutter component or components for the image library also is created. For example, target and clutter images within image library 124 of FIG. 1 are used to generate the correlation filters. The resultant energies from applying the filters is computed to determine the presence of candidate targets or clutter.

Step 208 executes by executing detection and enhancement operations for untrained detector components. Preferably, step 208 executes using untrained detection components 120 of FIG. 1. Preferably, step 208 executes in conjunction with step 206, or, alternatively, executes prior to or after 206. Step 208 differs from step 206 by not using apriori knowledge in an image library. Step 208 executes by performing frequency anomaly detection, or enhancement, as disclosed in greater detail below. Specifically, anomalies in the frequency domain are identified as candidate targets.

Step 210 executes by generating an output from the trained detector component. Preferably, step 210 combines the image data if it was separated in earlier steps. Step 210 generates an output wherein peak detections indicating candidate targets are highlighted and clutter is suppressed. Step 212 executes also by generating an output from the untrained detector component. Step 212 generates an output wherein peak detections are highlighted and clutter is suppressed. Step 214 executes by detecting candidate targets from the outputs. Alternatively, steps 210 and 212 are combined to generate one output using the results from 206 and 208, such as output 108 of FIG. 1. Step 214 detects candidate targets by identifying peaks within the image data that has been enhanced by the disclosed embodiments.

Figure 3:
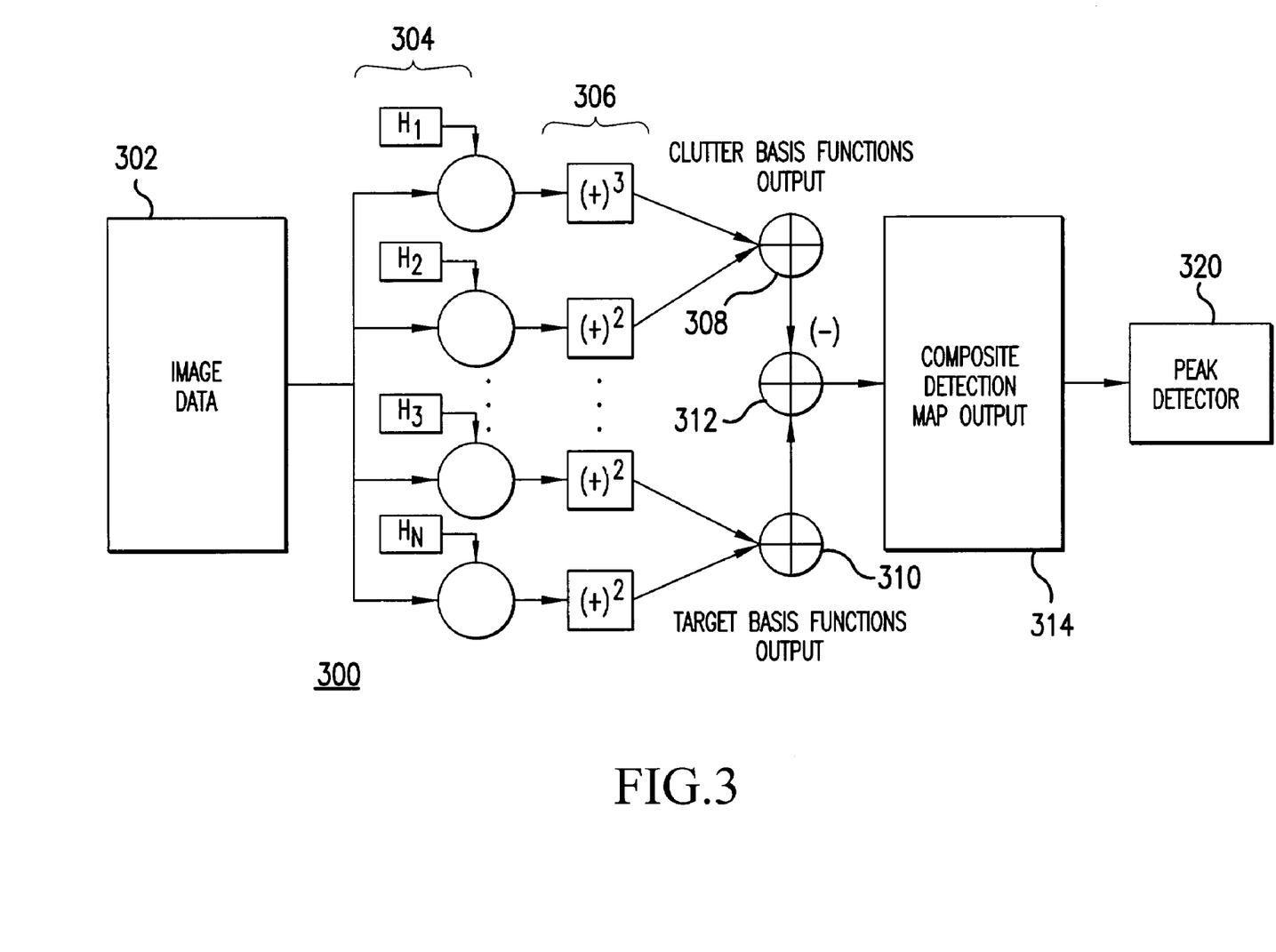
FIG. 3 illustrates an architecture for a trained detection component according to the disclosed embodiments.

FIG. 3 depicts an architecture for a trained detection component according to the disclosed embodiments. FIG. 3 relates to trained detection component 122 of FIG. 1. The architecture, however, of trained detection component 122 is not limited to disclosure of FIG. 3.

Trained detection component 300 receives image data 302 and outputs a composite detection map output 314. Peak detector 320 receives map output 314 and performs peak detection operations. Preferably, map output 314 is an enhanced composite of image data 302.

Trained detection component 300 also includes linear correlation filters 304. Each correlation filter can be designated in a transformation matrix H. Linear correlation filters 304 are embedded in the transformation matrix H. A set of linear correlation filters 304 can be applied to image data 302. Linear correlation filters 304 are related and categorized by their correlation to clutter or target images. Linear correlation filters 304, therefore, are ranked within the transformation matrix H according to whether a high correlation exists to the presence of clutter, or the absence of a target. Thus, linear correlation filter $H_l$ has a high correlation to the existence of clutter. Linear correlation filter $H_n$ has a high correlation to the presence of a target. The remaining linear correlation filters are ranked accordingly from $H_l$ to $H_n$. The dominant linear correlation filter for the presence of the target is the weakest linear correlation filter for the presence of clutter. In other words, the dominant linear correlation filter $H_n$ for target presence contains maximal information about the target while containing the smallest information about the clutter.

The first several dominant linear correlation filters of correlation filters 304 are used to correlate image data 302 where a high correlation output coefficient denotes the presence of a target. The weakest linear correlation filters of correlation filters 304 are correlated with the input image where a high correlation output reflects the presence of clutter, or the absence of a target. Trained detection component 300 utilizes both of these features to implement a detection algorithm tuned to available training samples from an image library.

For example, the dominant target linear correlation filter, or linear correlation filter $H_n$, has approximately 85% information about the target and approximately 15% information about the clutter. Thus, most of the data within linear correlation filter $H_n$ pertains to the presence of a target. Further, the dominant clutter linear correlation filter, or linear correlation filter $H_l$, has approximately 95% information about the clutter and approximately 5% about the target. Thus, most of the data within linear correlation filter $H_l$ pertains to the presence of clutter.

FIG. 3 discloses the implementation of a tuned base function scheme where image data 302 is processed by linear correlation filters 304 in a shift-invariant manner. The entire image comprised of image data 302 is projected on the tuned based function set, or linear correlation filters 304, in an efficient manner. The projection of every point in image data 302 from each column from linear correlation filter transformation matrix H is obtained by treating the column as an operator that is correlated with the entire scene. The correlation surfaces produced by the all the columns, or $H_l$-$H_n$, are squared by operators 306. Specifically, the energies resulting from the correlation of linear correlation filters 304 to the columns of image data 302 is squared.

Clutter output operator 308 sums up the squared energies for those linear correlation filters corresponding to clutter presence. Target output operator 310 sums the squared energies of those linear correlation filters corresponding to the presence of targets. Operator 312 then performs operations to obtain the tuned based function metric score for all points with an image data 302.

Operator 312 determines a difference in target and clutter filter response energies for pixels with an image data 302. Preferably, a large positive difference indicates the presence of the candidate target, while a large negative difference indicates clutter. Map output 314 can be a composite image treated as a detection map where large differences indicate the presence of candidate targets. Peak detector 320 identifies the large differences for further target detection processing. Preferably, a threshold is specified wherein differences above the threshold indicate the presence of candidate target. The threshold is application specific, and is set low for a high probability of detection, or high if the application wants to minimize the number of false alarms.

Figure 4:
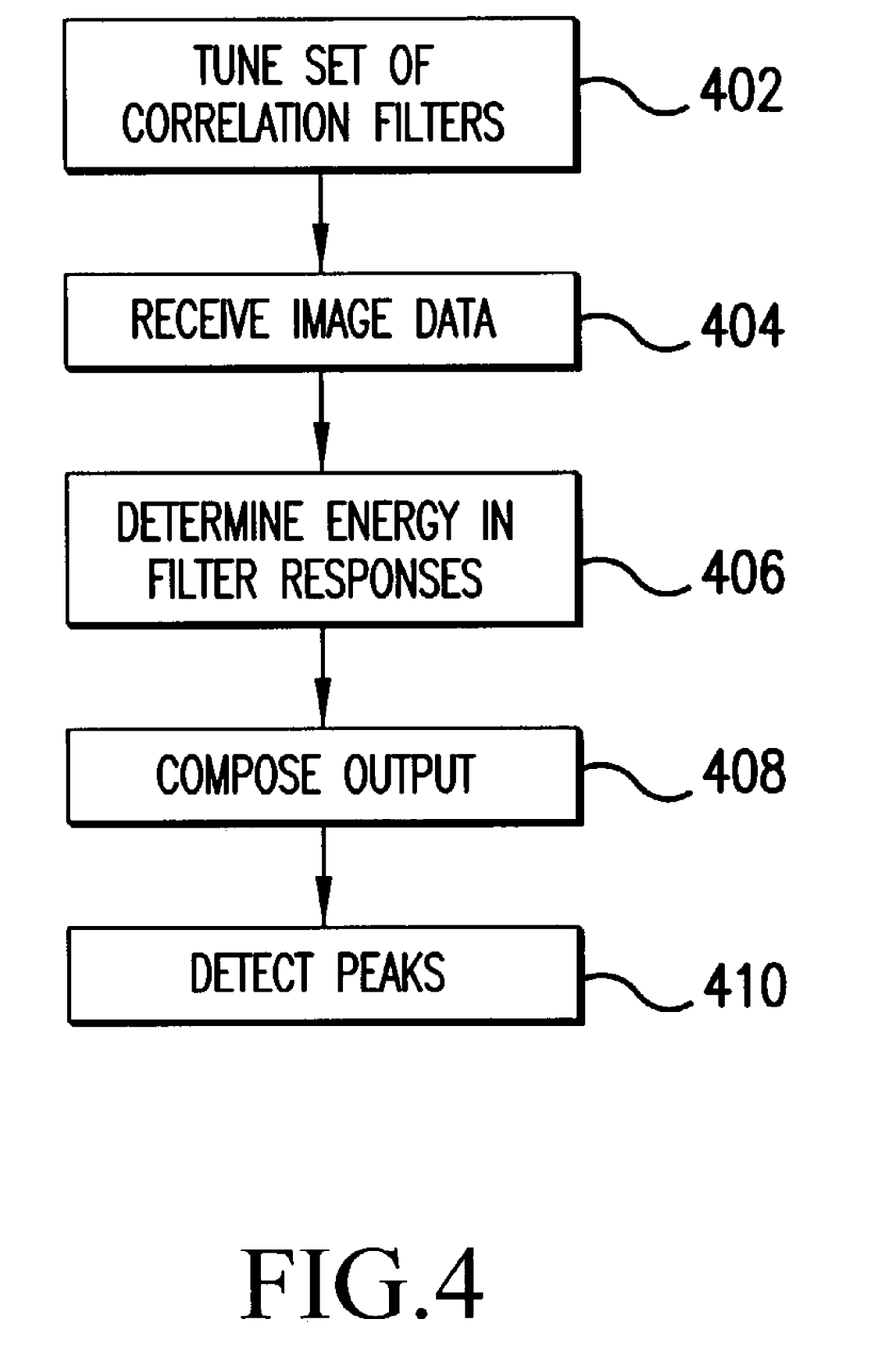
FIG. 4 illustrates a flowchart for enhancing imagery and detecting candidate targets in a trained detection environment according to the disclosed embodiments.

FIG. 4 depicts a flowchart for enhancing imagery and detecting candidate targets in a trained detection environment according to the disclosed embodiments. Preferably, the flowchart of FIG. 4 is implemented by the hardware configuration disclosed in FIG. 3. Step 402 executes by tuning a set, or bank, of linear correlation filters, such as linear correlation filters 304 of FIG. 3. The linear correlation filters also are known as the transformation matrix H. Referring to FIG. 3, linear correlation filters 304 are arranged in columns within the transformation matrix H. Preferably, each correlation filter relates to a composite of images from the image library, such as image library 124 of FIG. 1. Linear correlation filters are divided into target and clutter correlation filters that have projected energies for targets and clutter, respectively.

Step 404 executes by receiving image data from one or more sensors within a detection system, such as detection system 100 of FIG. 1. Preferably, the image data is comprised of pixels. Further, the image data preferably is reformatted or modified to be a specified size. For example, referring to FIG. 3, if the transformation matrix H of linear correlation filters 304 requires the image to be the specified size, then image data 302 is modified to be compatible with the transformation matrix H.

Step 406 executes by determining the energy in the filter responses. Referring to FIG. 3, linear correlation filters 304 are applied to image data 302 such that each pixel within image data 302 is correlated to each linear correlation filter. Correlation filters 304 are embedded in the columns of transformation matrix H. Preferably, each column is reordered to form an m×n correlation filters. Correlation filters 304 are applied to image data 302 by a convolution operation. The correlation surfaces, or energy, produced by the correlation filters 304 correlated to image data 302 are squared by operators 306. Clutter output operator 308 and target output operator 310 add the respective clutter and target correlation surfaces, or energies. The tuned based function energy metric score for the energies of all points in image data 302 is calculated. The tuned based function energy metric is the difference between the target and clutter energies. The difference in energy metric is what is thresholded to find targets in image data 302. The difference threshold is application dependent in that its value is set according to the specifications of the application. For example, if the application specifies a high probability of detection, then the threshold is set low. If the application wants to minimize false alarms, then the threshold is set high. The threshold is adaptively varied to adjust target detection capabilities. As noted with reference to FIG. 3, a large positive difference, or tuned based function energy metric, indicates the presence of a candidate target within the image data.

Step 408 executes by composing an output that is treated as a detection map for indicating the presence of potential candidate targets. Referring to FIG. 3, map output 314 is generated with the large differences indicating candidate targets. The output can correspond to the image data received in step 402, except candidate target data is enhanced and clutter data suppressed. Step 410 executes by detecting peaks within the output, wherein these peaks signify energy within the image data that relate to candidate targets. Referring to FIG. 3, peak detector 320 identifies the parts of output map 314 with candidate targets.

Figure 5:
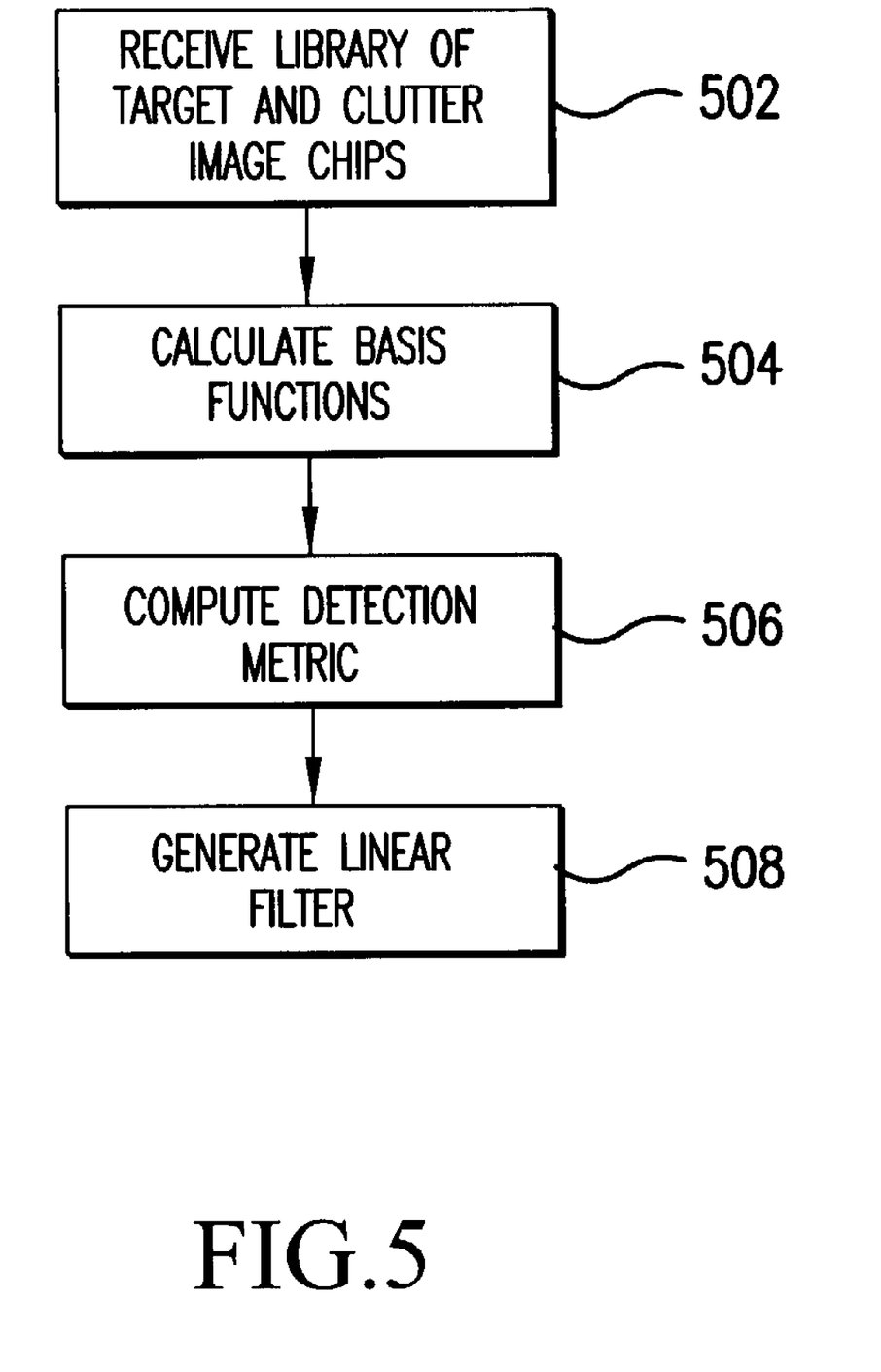
FIG. 5 illustrates a flowchart for generating linear filters for use with a trained detection environment according to the disclosed embodiments.

FIG. 5 depicts a flowchart for generating linear filters for use with a trained detection environment according to the disclosed embodiments. FIG. 5 relates to Step 402 of FIG. 4. FIG. 4, however, is not limited by the disclosure of FIG. 5. Preferably, the flowchart of FIG. 5 is implemented by the hardware configuration disclosed in FIG. 1. Specifically, trained detection component 122 generates the linear correlation filters, such as linear correlation filters 304 of FIG. 3.

Step 502 executes by receiving a library of target and clutter images. These images also are referred to as image chips, wherein each image chip has a specified size. Preferably, the image chip size is m×n. Referring to FIG. 1, image library 124 contains image chips. Step 504 executes by calculating the target and clutter basis functions. The basis functions are defined to separate targets from clutter, and are trained, or derived, from the image chips. The basis functions are derived from each image chip.

Preferably, all of the image chip vectors lie in a linear vector space. The pixels in the image chips are reordered into vectors within the linear vector space. The linear vector space has a dimension m×n and a basis set for this space uses m×n vectors. Any vector in the linear vector space is represented as linear combinations of the elements of the basis set. Furthermore, if the elements of the basis set are orthogonal, then the coefficients are given by an inner product. This inner product is a correlation operation when the image chip vectors are reordered back from the vectors to image chips. Many different orthogonal basis sets for the linear vector space are utilized to generate the basis functions, or filters. The disclosed embodiments, however, preferably seek the basis set that separates targets from clutter. Within the linear vector space, target vectors and clutter vectors can exist. These vectors can be transformed into class covariance matrixes or $$\Sigma_1 = E\{(x - \bar{x})(x - \bar{x})^T\}$$

$$\Sigma_2 = E\{(y - \bar{y})(y - \bar{y})^T\}$$

The sum of these matrices $$(\Sigma_1 + \Sigma_2)$$

is positive semi-definite and can be factored in the form $$(\Sigma_1 + \Sigma_2) = \Phi \Delta \Phi^T$$

where $\Phi$ is the matrix of eigenvectors of $$(\Sigma_1 + \Sigma_2)$$

and $\Delta$ is a diagonal matrix of eigenvalues.

Then a transformation operator P can be defined as $$P = \Phi \Delta^{-1/2},$$

and new data vectors $\hat{x} = P^T x$ and $\hat{y} = P^T y$. It follows that $$P^T(\Sigma_1 + \Sigma_2)P = I.$$

Also, the covariance matrices for the transformed data $\hat{x}$ and $\hat{y}$ are $$A = P^T \Sigma_1 P$$

and $$B = P^T \Sigma_2 P$$

respectively. Owing to the identity above, it is shown that A+B=1, i.e.

$$A + B = P^T \Sigma_1 P + P^T \Sigma_2 P = P^T(\Sigma_1 + \Sigma_2)P = 1$$

If $\theta$ is an eigenvector of A with corresponding eigenvalue $\lambda$, then it is also an eigenvector of B but with eigenvalue $(1-\lambda)$. If $\theta$ satisfies $A\theta = \lambda\theta$ (by definition of an eigenvector) then it follows that $(1-B) \theta = \lambda\theta \Rightarrow B\theta = (1-\lambda)\theta$.

Thus, $\theta$ is also an eigenvector of B but with eigenvalue $1-\lambda$. This relationship shows that the transformed data covariance matrices will have the same eigenspaces. It should be noted that the corresponding eigenvalues of A and B associated with the same eigenvector will add to 1.

Thus, the dominant eigenvector of A is the weakest eigenvector of B and the weakest eigenvector of A is the dominant eigenvector of B. In the language of target detection, the dominant eigenvector of A contains maximal information about the target space while containing the smallest information about the clutter space. Therefore, the first several dominant eigenvectors of A (target basis functions) can be used to correlate an input image where a high correlation output coefficient denoting the presence of a target. Also, the weakest eigenvectors of A (anti-target, or clutter, basis functions) can be correlated with an input image where a high correlation output reflects the presence of clutter or the absence of a target. The disclosed embodiments utilize both of these facts to create a detection algorithm tuned to the available training samples.

The complete set of eigenvectors of the matrix A (which are also eigenvectors of the matrix B) is an orthogonal basis for $R^{mn}$. Furthermore, the eigenvalue associated with a particular eigenvector yields a measure of the amount of target and/or clutter information described by that eigenvector. Therefore, a methodology for defining a set of basis functions that are to become correlation filters, such as correlation filters 304 of FIG. 3, are determined that has the desired property of separating targets from clutter.

Step 506 executes by computing a tuned based function detection metric. The detection metric is determined by choosing a small subset within dominant target and clutter basis functions. The detection metric measure how well each basis function separates candidate targets and clutter.

For implementation of the detection strategy, we choose only a small subset of dominant target and clutter basis functions, calculated above. Specifically, we choose $N_1$ basis functions that best represent clutter and $N_2$ basis functions which best represent targets and define the matrix $\theta$ as $$\theta = [\theta_1 \theta_2 \ldots \theta_{N_1+1} \theta_{N_1+2} \ldots \theta_{N_1+N_2}]$$

A test image vector z is projected onto this set to obtain a feature vector v of length $N_1+N_2$, i.e., $v = \theta^T z$. Then, the detection metric defined is computed as $$\varphi = \sum_{i=N_1+1}^{N_1+N_2} v^2 i - \sum_{i=1}^{N_1} v^2 i$$

The first summation on the right hand side of the metric is the net energy in the projections of the test image on the target basis functions. The second summation is the net energy projected on the clutter basis functions. The detection metric Φ is the difference in these projected energies, and is expected to be large for target and small for clutter. The basis functions having large detection metrics are selected to become linear correlation filters.

Step 508 executes by generating the linear correlation filters. Referring to FIG. 3, linear correlation filters 304 are generated. The linear correlation filters are generated from the basis functions calculated above according to the scores or detection metrics determined in step 506. The linear correlation filters are correlated to the image data received in a detection system, such as detection system 100 of FIG. 1, to determine the presence the candidate targets. Clutter is suppressed as well.

Figure 6:
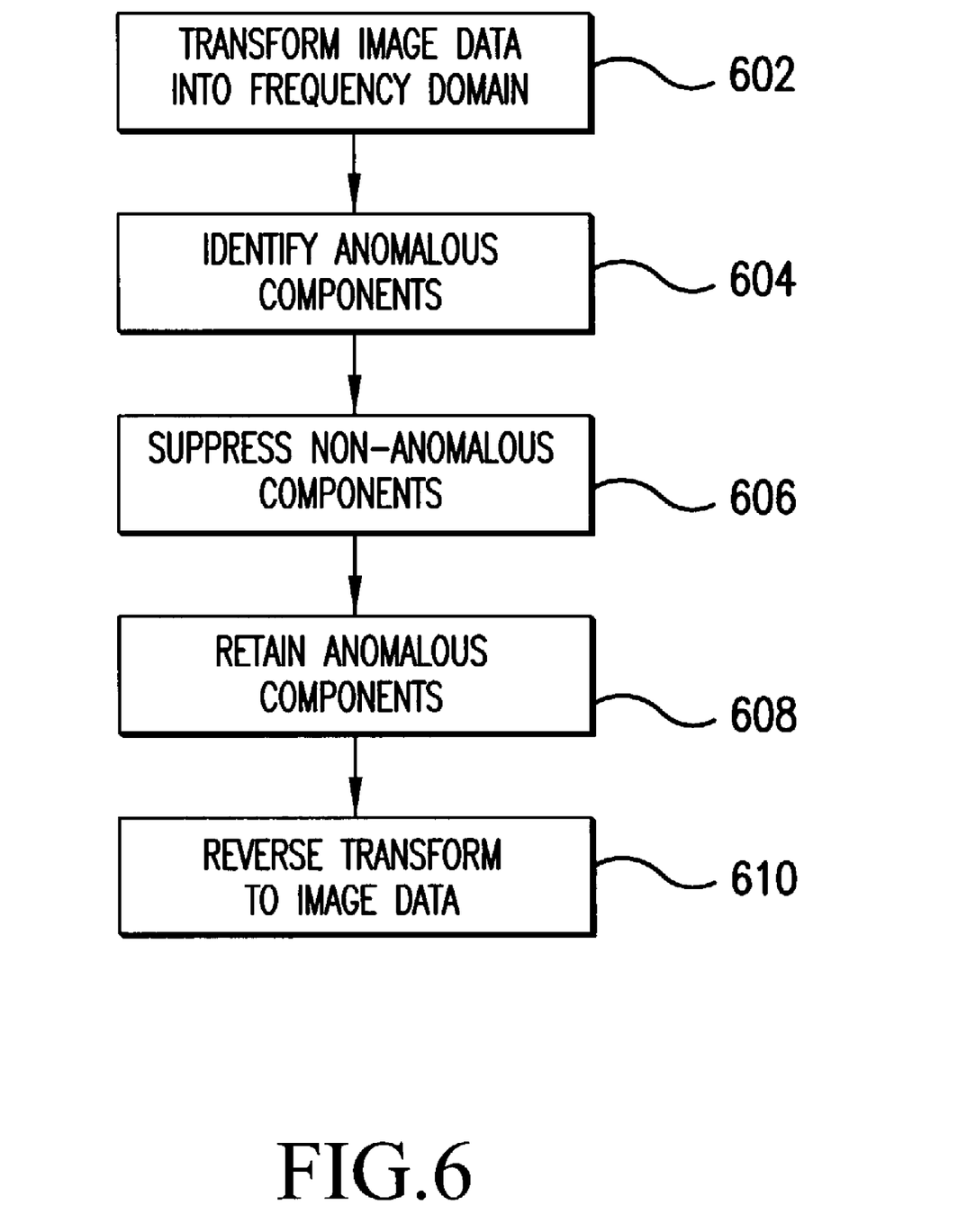
FIG. 6 illustrates a flowchart for enhancing image data and detecting candidate targets in an untrained detection environment according to the disclosed embodiments.

FIG. 6 depicts a flowchart for enhancing image data and detecting candidate targets in an untrained detection environment according to the disclosed embodiments. The disclosed embodiments of FIG. 6 seek image enhancement that raises the intensity of outlying candidate target pixels and, at the same time, suppresses background/or clutter, pixels. The disclosed embodiments of FIG. 6 do not use pixel-level processing as anomalies are identified in the frequency domain. Thus, because the disclosed embodiments are not specifically pixel intensity-based, low signal to noise ratio targets can be significantly enhanced if the target frequency domain characteristics are identifiable compared to the background frequency domain characteristic.

Typically, an untrained detection algorithm relies on statistics of the local image intensity in order to highlight regions that are statistically different from the region's immediate surroundings. The fact that no apriori knowledge of a target library needed constitutes an advantage for these detection algorithms. The flowchart of FIG. 6 is implemented by the hardware configuration disclosed in FIG. 1. Specifically, untrained detection component 120 executes the embodiments disclosed with reference to FIG. 6.

Step 602 executes by transforming image data into the frequency domain. Referring to FIG. 1, the window size can be selected for image data 104 and image data 104 modified to fit the window size. For the image data, a Fourier frequency transform is applied down each column. A sub-image is generated approximately equal to the window size of the image, wherein each row is a Fourier frequency bin. Preferably, each frequency bin is treated as an independent random variable from the stationary random clutter process across the columns of data.

Step 604 executes by identifying anomalous components within the sub-image of frequency content. The frequency bins for the sub-image correlate to the rows of image data received earlier. Preferably, step 604 normalizes each row to a standard normal distribution that highlights anomalous frequency bin components. Identification of anomalous components is done by using a threshold on the data in the frequency bins. Thresholding the data results in approximation of the non-stationary components of the Fourier transforms sub-image.

Step 606 executes by suppressing non-anomalous components within the frequency domain. Specifically, each element of the frequency bins not identified as anomalous is set to zero. Thus, non-anomalous components that correlate to clutter in the image data are suppressed. Step 608 executes by retaining anomalous components in the frequency domain. Thus, while clutter is suppressed, candidate target information is highlighted. Step 610 executes by reverse transforming the retained components of the frequency domain sub-image back to the image data. The inverse Fourier transform applied to the thresholded data will result in an enhanced image where candidate targets are highlighted, and stationary clutter suppressed. According to the preferred embodiments, image anomalies are detected by converting the image data into the frequency domain before suppressing clutter without smoothing away complex pixel interaction within the image.

Further, the disclosed embodiments of FIG. 6 preferably are applied over specific regions of the image data. Certain regions obviously contain clutter or target information, and no further processing is needed. This feature can reduce processing requirements for using untrained detector components. Candidates targets are enhanced as a result, and other non-stationary regions are highlighted as well.

Thus, the preferred embodiments of the present invention disclose using trained and untrained detection components. Image data is received and analyzed for candidate targets within the image data. The trained detection component uses linear correlation filters to produce energies from the image data that correlates to target or clutter presence. The trained detection component also generates the linear correlation filters using images from an image library. The untrained detection component performs a frequency transform of the image data, and then identifies anomalies in the frequency domain. The anomalous data is retained, and the non-anomalous data is suppressed by the untrained detection component. The frequency data is reversed transformed to highlight those parts of the image data relating to the anomalous data to highlight the presence of candidate targets.

It will be apparent to those skilled in the art the various modifications and variations can be made without departing from the spirit or scope of the invention. thus, it is intended that the present invention covers the modification of variations of the disclosed embodiments provided that they come within the scope of the following claims and their equivalence.

What is claimed is:

1. A target detection system that receives image data, comprising:
 a trained detection component that separates candidate target regions from clutter within the image data using a plurality of correlation filters trained from an image library;
 an untrained detection component that separates the candidate target regions from the clutter by enhancing the image data using a frequency transform; and
 an output highlighting the candidate target regions.

2. The target detection system of claim 1, further comprising an input device to capture the image data.

3. The target detection system of claim 1, wherein the image data comprises pixels.

4. The target detection system of claim 1, wherein the image library comprises target images and clutter images.

5. A method for enhancing imagery for target detection, comprising:
 receiving image data;
 determining candidate target regions from clutter within the image data using linear correlation filters, wherein the linear correlation filters are trained using an image library;
 determining the candidate target regions from the clutter by suppressing the clutter in a frequency domain transform of the image data; and identifying peak detections from an output generated by the determining steps, wherein the peak detections correspond to candidate targets.

6. The method of claim 5, wherein the determining steps are executed in a parallel manner.

7. The method of claim 5, wherein the first determining step includes identifying the candidate target regions by determining energies from correlating the linear correlation filters with the image data.

8. The method of claim 5, wherein the second determining step includes identifying anomalous components within the frequency domain transform of the image data.

9. A system for performing trained detection operations on image data, comprising:

linear correlation filters trained from an image library, wherein each of the linear correlation filters is applied to the image data to produce target and clutter filter response energies;

a summation component to determine the difference between the target filter response energies and the clutter filter response energies; and a peak detector to detect a candidate target according to the difference between the target filter response energies and the clutter filter response energies.

10. The system of claim 9, wherein the difference is above a specified amount corresponding to the candidate target.

11. The system of claim 9, wherein the linear correlation filters are trained according to target images within the image library.

12. The system of claim 9, wherein the linear correlation filters are trained according to clutter images within the image library.

13. The system of claim 9, further comprising a transformation matrix comprising the linear correlation filters, wherein the transformation matrix is applied linearly to the image data.

14. The system of claim 9, further comprising an output map indicating the differences between the target response energies and the clutter response energies.

15. The system of claim 9, wherein the target response energies are derived from correlating pixels within the image data to target linear correlation filters.

16. The system of claim 9, wherein the clutter response energies are derived from correlating pixels within the image data to clutter linear correlation filters.

17. A method for enhancing image data for target detection, comprising:

tuning linear correlation filters with image chips from an image library, wherein the image chips include target and clutter images;

determining energy in filter responses by correlating the linear correlation filters with the image data; and composing an output detection map of the combined filter responses to denote candidate targets and clutter.

18. The method of claim 17, further comprising detecting peaks within the output detection map for indicate the candidate targets and the clutter.

19. The method of claim 17, wherein the tuning step includes:

receiving the image chips from the image library;

calculating basis functions of the image chips;

computing detection metrics for the basis functions; and generating the linear correlation filters according to the detection metrics.

20. The method of claim 19, further comprising selecting the basis functions according to the detection metrics.

21. The method of claim 19, further comprising separating the basis functions into target basis functions and clutter basis functions.

22. A system for enhancing imagery for target detection, comprising:

means for receiving image data;

means for determining candidate target regions from clutter within the image data using a set of linear correlation filters, wherein the linear correlation filters are trained using an image library;

means for determining the candidate target regions from the clutter by suppressing the clutter in a frequency domain transform of the image data; and means for identifying peak detections from an output generated by the determining steps, wherein the peak detections correspond to candidate targets.

23. A system for enhancing a target image from image data for target detection, comprising:

an untrained detection component that transforms the image data into a frequency domain representation, and identifies anomalous components within the frequency domain representation, wherein the frequency domain representation is reversed transformed retaining the anomalous components;

an output containing portions of the image data corresponding to the anomalous components.

24. A computer-readable storage medium having a computer program stored therein, the computer program when executed causes a computer to perform an image enhancement for target detection comprising steps of:

receiving image data;

determining candidate target regions from clutter within the image data using a plurality of linear correlation filters, wherein the linear correlation filters are trained using an image library;

determining the candidate target regions from the clutter by suppressing the clutter in a frequency domain transform of the image data; and identifying peak detections from an output generated by the determining steps, wherein the peak detections correspond to candidate targets.

25. A computer-readable storage medium having a computer program stored therein, the computer program when executed causes a computer to perform an image enhancement for target detection comprising steps of:

tuning linear correlation filters with image chips from an image library, wherein the image chips include target and clutter images;

determining energy in filter responses by correlating the linear correlation filters with the image data; and composing an output detection map of the combined filter responses to denote candidate targets and clutter.

* * * * *